Patented Jan. 27, 1948

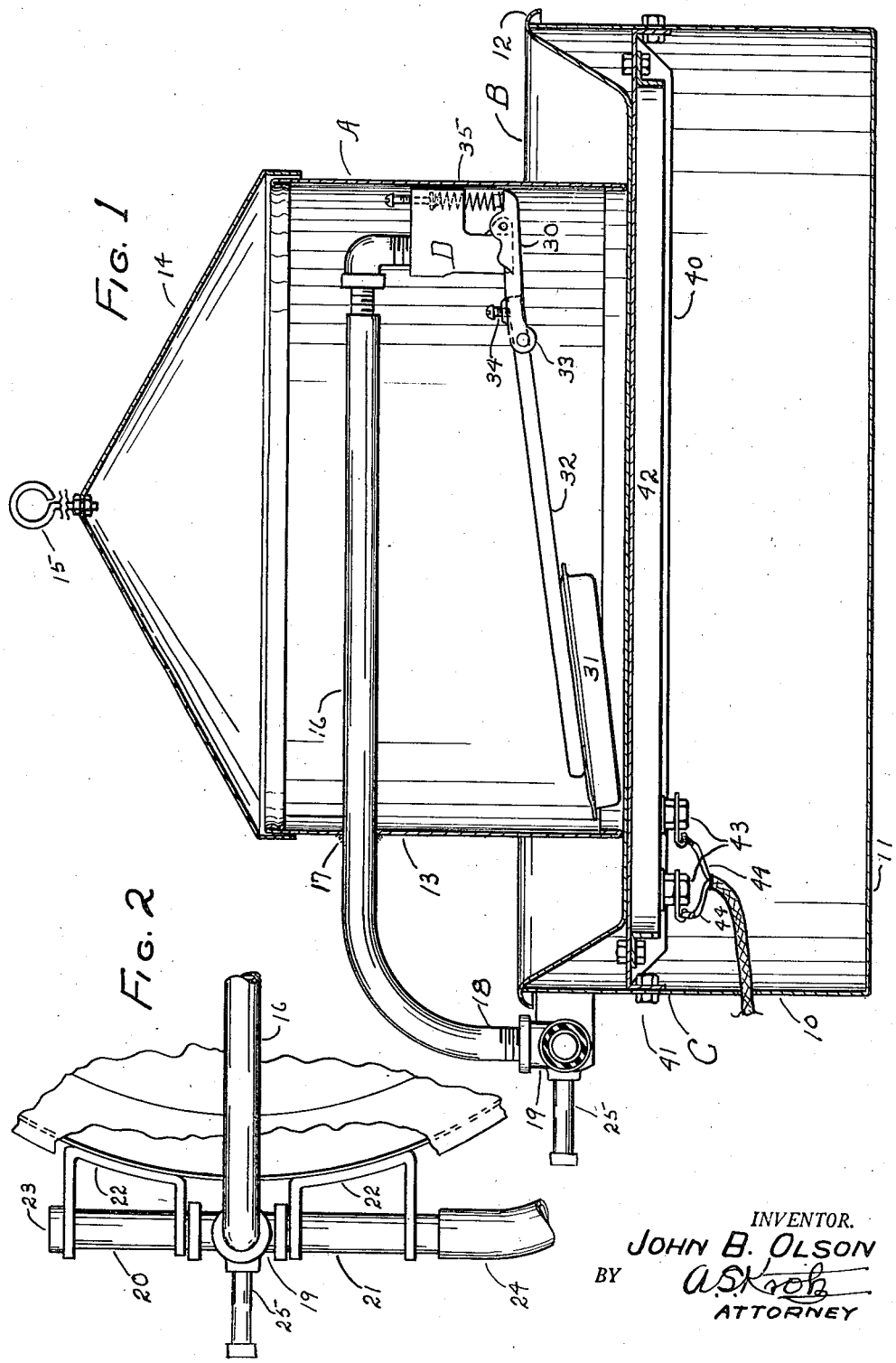

2,435,015

UNITED STATES PATENT OFFICE 2,435,015

AUTOMATIC POULTRY WATERER

John B. Olson, Fort Atkinson, Wis., assignor to James Manufacturing Company, Fort Atkinson, Wis.

Application February 11, 1946, Serial No. 646,938

3 Claims. (Cl. 119—78)

The present invention relates to a waterer having an automatic float controlled water supply, including a serving pan and a centrally positioned enclosure adapted to form a narrow annular exposure of the water around the edge of the pan, the enclosure having a cone shaped or peak roof or cover adapted to prevent the birds from standing or roosting on the enclosure.

A novel feature of my invention is the pivotal mounting of the enclosure on the supporting base, this mounting comprising a pipe which extends downwardly to a transverse pipe hinge fitting mounted on the supporting base, the hinge tubing acting as an axis for the enclosure, the inner end of the pipe having secured thereto a float controlled valve for determining the height of the water in the pan.

An important feature of my invention is the position of the float controlled valve and the float having means whereby when the enclosure is moved far enough out of the pan on its hinge the valve will be automatically closed and remain closed until the enclosure is moved back into position in the pan.

An object of the present invention is to provide a waterer which is as nearly automatic as possible and is easily handled. For example for cleaning the pan all that is necessary is to lift the enclosure on its hinge to a vertical position and remove the pan; or before removing the pan the enclosure may be brush cleaned with water in the pan while the enclosure is still over the pan.

My improved waterer is provided with a base to which the hinge is attached and on which the pan is supported and having a bracket or openings positioned a short distance below the bottom of the pan, on which may be mounted an electric heating element for use during very cold weather.

The principal objects of the present invention are to provide a simple waterer that can be manufactured at low cost, is efficient and practically indestructible.

To these and other useful ends my invention consists of the parts, combinations of parts or their equivalents and mode of operation as hereinafter described and claimed and shown in the accompanying drawings in which:

Fig. 1 is a vertical section through the pan supporting base, pan and enclosure.

Fig. 2 is a top view of the enclosure hinge and illustrating a fraction of the pan and supporting base.

As thus illustrated the enclosure is designated by reference character A; the pan is designated by reference character B; and the base is designated by reference character C.

Member C comprises a circular member, the side wall of which is designated by numeral 10 having a bottom 11. Pan B has downwardly curved edges 12 adapted to lay on the top of member C.

It will be understood that member C may be positioned on the floor of the poultry house or held in an elevated position on a frame having supporting legs and a hexagonal shaped perch may be mounted on the top of the frame, for the birds to stand on while drinking. This supporting frame is too well known in its design and use to require further description.

I provide an enclosure A, the wall 13 of which is the right diameter so the proper width of water exposure is provided. This enclosure rests on the bottom of the pan as illustrated and having preferably a cone shaped roof 14. The apex of the roof having secured thereto a loop 15 which acts to prevent a bird from standing on the peak of the roof and as a handle. A pipe 16 extends through the wall 13 of member A and being secured thereto as at 17 by brazing or otherwise. Pipe 16 is curved downwardly on its outer end, the downward end 18 of which is screw-threaded into a pipe T 19, the T having screwed therein a pipe 20 and at its other end a pipe 21. Pipes 20 and 21 are rotatably mounted in brackets 22. Thus it will be seen that member A can be swung upwardly on pipes 20 and 21 as axes. Pipe 20 is closed on its outer end by means of a pipe cap 23 and pipe 21 is adapted to receive the end of a rubber hose 24, the hose having a connection to a water supply pipe (not shown) positioned a short distance from the hinge so hose 24 will flex enough to permit raising member A without injury. Member 19 is provided with a side outlet into which a short pipe 25 is screwed. This short pipe acts as a stop for the enclosure when the enclosure is in a position to remain by gravity in its raised position.

I provide a supply valve which in its entirety is designated by reference character D, having a connection to the inner end of pipe 16 as indicated in Figure 1. This valve is similar to the one shown in my pending application Serial Number 580,514, filed March 2, 1945, differing only in the fastening of the float arm to the valve lever. The valve lever is designated by numeral 30. A float 31 is secured to a float arm 32 which is hinged to member 30 as at 33. I provide a screw 34 in member 30 against which the inner end of member 32 rests. Thus by moving screw 34, the position of float 31 relative to member 30 may be changed so as to determine the height of the water. Thus clearly the height of the water in pan B may be conveniently regulated. When the enclosure is in the position shown in Figure 1, the valve will be under the control of the float. When the water reaches the predetermined height the valve will be closed by spring 35.

It will be seen that when enclosure A is swung to a position determined by pipe 25 the valve will be closed. In fact the valve is closed while the enclosure is still over pan B.

Thus it will be seen that when it is desired to clean the pan, enclosure B may be swung to its vertical position and then when the pan is replaced the enclosure is returned to its operating position and water will be permitted to flow into the pan to the predetermined level.

The bottom edge of member A may be cleaned by raising this member somewhat and using a brush for the purpose which may be dipped into the water in the pan for the purpose. Thus any ordinary person can take care of my watering device because of its simplicity and positive action.

I provide a bracket or plate 40 having right angle ends which are secured to member 10 by means of bolts 41—41, the apertures for these bolts being provided in regular production. If a customer wishes an electric heater, the heater and its bracket may be supplied separately. An electric heater pad 42 is attached to member 40 having binding posts 43—43 with lead wires 44—44 which extend through a conveniently positioned opening in member 10. Wires 44 are positioned in a suitable cable having a plug-in socket on its free end for making connection to an electric supply.

Having thus shown and described my invention, I claim:

1. In combination, a circular supporting base, a water pan having an outwardly and downwardly turned edge adapted to rest on the top of the supporting base, an enclosure having a peak shaped roof, the bottom of said enclosure being adapted to rest on the bottom of said pan and having a diameter to thereby provide a narrow annular exposed space around the edge of the pan, a tube having on its inner end a float control valve, said tube being extended through and attached to the wall of the enclosure, the outer end of said tube extending downwardly and being hinged to said supporting base near the top thereof, said hinge having a water connection to said tube, and means whereby water pressure is supplied to said tube and valve, the float of said valve being adapted to control the water level in the pan and to shut the water off when the enclosure is moved on its hinge to a vertical position.

2. In combination, a circular supporting base, a water pan having an outwardly and downwardly turned edge adapted to rest on the top of the supporting base, an enclosure having a peak shaped roof, the bottom of said enclosure adapted to rest on the bottom of said pan and having a diameter to thereby provide a narrow annular exposed surface between the pan and enclosure, a valve positioned in said enclosure having a supply pipe which extends through the enclosure to a hinge, the hinge being secured to the supporting base near the top thereof, said valve having a float adapted only to open the valve and a spring adapted only to close the valve, adjustable means between said float and valve adapted to determine the water level at which the valve is opened, and means associated with said hinge whereby a stationary water supply means may be supplied to said connected pipe.

3. A poultry waterer of the character described comprising, a circular supporting base, a water pan having an outwardly and downwardly turned edge adapted to rest on the top of the supporting base, an enclosure having an open bottom adapted to lie on the bottom of the pan and having a diameter to thereby provide a narrow annular exposed space around the edge of the pan, a tube having on its inner end a float controlled valve secured to said enclosure, said tube on the opposite end from the valve being extended through the wall of the enclosure, the outer end of said tube being hinged to said supporting base near the top of the base, said hinge having a water connection to the tube and means whereby water pressure is supplied through the hinge and tube end to said valve, the float of said valve being adapted to control the water level in the pan and also shut the valve when the enclosure is raised and moved past a vertical position on said hinge as an axis.

JOHN B. OLSON.

REFERENCES CITED

The following references are of record in the file of this patent:

UNITED STATES PATENTS

| Number | Name | Date |
| --- | --- | --- |
| 1,419,025 | Coultas | June 6, 1922 |
| 1,475,403 | Mitchell | Nov. 27, 1923 |
| 1,786,024 | Olson | Dec. 23, 1930 |
| 1,796,672 | Thompson | Mar. 17, 1931 |
| 1,828,104 | Divekey | Oct. 20, 1931 |
| 1,892,909 | Stradling | Jan. 3, 1933 |
| 1,929,789 | Olson | Oct. 10, 1933 |
| 1,961,092 | Smith | May 29, 1934 |